Oct. 2, 1956   P. GOTTFRIED   2,764,974
COOKING VESSEL
Filed Sept. 15, 1952

Inventor,
Paul Gottfried
By: Schneider & Dressler, Attys.

United States Patent Office 2,764,974
Patented Oct. 2, 1956

2,764,974

COOKING VESSEL

Paul Gottfried, Chicago, Ill., assignor to Chambers Corporation, a corporation of Indiana Application September 15, 1952, Serial No. 309,616

9 Claims. (Cl. 126—390)

This invention relates to a cooking vessel, and is particularly concerned with a vessel having a wall or walls, preferably the bottom wall, transparent to radiant energy and provided with a material incorporated in said bottom, or provided as a surface on said bottom, capable of converting the radiant energy entering the bottom into sensible heat within the vessel. In its preferred form, the cooking vessel has its side wall or walls constructed to minimize the transfer of said heat by conduction from the inside of the vessel to the outside atmosphere.

This application is a continuation-in-part of my co-pending application, Serial No. 210,357, filed February 10, 1951, now abandoned.

The cooking vessel constructed in accordance with the present invention is preferably formed of glass, although it may be formed of transparent plastic material or other material that will not interfere with the transmission of radiant energy rays, such as infra-red rays, therethrough, and will be capable of withstanding the heat encountered during cooking. The cooking vessel is so positioned in use relative to the source of the radiant energy rays that these rays pass through the walls of the cooking vessel and impinge on the material designed specifically to convert the radiant energy rays to sensible heat. The radiant energy rays may be generated by gas-fired infra-red sources, such as gas-fired refractory material, by electric resistance wire or by reflector lamps which direct the rays in a concentrated beam against the bottom and/or side wall of the cooking vessel. Where the radiant energy rays are directed against the side wall, that wall should have a construction similar to the bottom wall. Preferably the outer surface of the portion of the cooking vessel against which the radiant energy rays are directed is rough-finished to decrease reflection of the rays directed thereagainst.

A material capable of converting radiant energy to sensible heat is incorporated in or on the wall of the cooking vessel against which the radiant energy rays are directed. This wall is preferably the bottom wall, but it is obvious that the sources of the radiant energy rays could be arranged to send the rays through the side wall of the vessel or through both the bottom wall and the side wall.

The material capable of converting radiant energy rays to sensible heat within the vessel is a coloring material which may be incorporated in the wall itself or applied as a surface layer to the wall. When incorporated in a wall of the cooking vessel, the coloring material is preferably positioned in the portion of the wall adjacent the interior although it may also be incorporated throughout the entire thickness of the wall.

When so positioned, the coloring material which is preferred may be any suitable material, preferably a black material, known in the art to color glass or other transparent materials, for example, carbon. Other coloring materials, for example, salts having colored cations such as copper nitrate, nickel nitrate or cobalt nitrate may be used to produce various colors. When applied as a surface layer, the material preferably is a dull black material capable of withstanding heat such as a black chromate paint, a Glyptal resin graphite paint or other suitable black paint, or it may be a thin layer of a conventional heat absorbing glass in either the usual green or blue color, or other material capable of converting radiant energy to sensible heat. The layer is provided on or adjacent the inner surface of the wall of the cooking vessel against which the radiant energy rays are directed. It may be applied to the inner surface of the bottom or side wall as a lining, or it may be applied as a separate member positioned adjacent the desired wall or walls.

The coloring materials described above are known and per se form no part of this invention. As is also known, these materials absorb radiant energy rays. In the cooking vessel of my invention, these coloring materials absorb the radiant energy rays that impinge thereon and convert them to sensible heat within the wall or walls of the cooking vessel with maximum efficiency.

The conversion of radiant energy rays, such as infra-red rays, to sensible heat within the walls of the cooking vessel of the present invention provides a more uniform distribution of heat within the vessel and causes a greater proportion of the heat energy generated to be utilized in cooking the food contained therein. Cooking is much more efficient than with either an opaque metal vessel or a completely transparent vessel. With an opaque metal vessel, much heat is lost by conduction through the walls of the vessel. With a completely transparent vessel, the radiant energy rays are converted to sensible heat upon striking the food to be cooked which is contained within the vessel, and as a consequence, the cooking is affected to a great extent by the color and shape of the food, so that accurate control of the cooking is difficult to achieve.

The cooking vessel may be provided with a double-wall structure to provide dead air insulation around the vessel, thereby reducing the heat loss by conduction to the surrounding atmosphere and increasing cooking efficiency. The double-wall structure may be applied to the bottom and side wall or walls of the vessel, or to either. The dead air insulating space may be provided around the side walls by having side walls depend from the top cover for the cooking vessel.

The structure by means of which the above and other advantages of the invention are attained will be described in detail in the following specification taken in conjunction with the accompanying drawings, showing preferred illustrative embodiments of the invention, in which.

Figure 5:
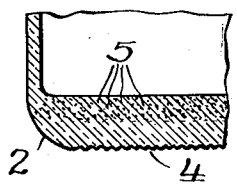
Figure 6:
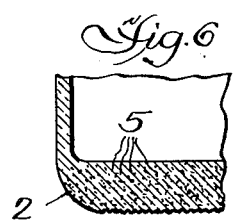
Figure 7:
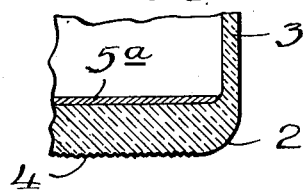

Fig. 5 is an enlarged fragmentary cross sectional view of the lower corner structure of a cooking vessel embodying the present invention and showing the cooking vessel bottom provided with a rough finish to decrease reflection of radiant energy rays impinging thereon and showing a coloring material capable of converting radiant energy into sensible heat incorporated in a portion of the bottom wall;

Fig. 6 is a view similar to Fig. 5 wherein the coloring material is incorporated throughout the entire bottom wall; and Fig. 7 is a view similar to Fig. 5, of another form of construction, wherein the coloring material is applied as a layer adjacent the inner surface of the bottom.

In the drawings, the reference numeral 2 indicates the bottom of a cooking vessel having an upstanding side wall 3. The vessel shown has a conventional circular side wall, but it may have any desired shape. The bottom may be of any suitable material that is substantially transparent to radiant energy rays and the side wall may be of the same material or other suitable material. One such suitable material is glass, such as a heat-resistant glass manufactured by the Corning Glass Works under the trademark "Pyrex," which is desirable because it permits the passage of radiant energy rays and is capable of withstanding the conditions encountered in cooking. Where it is desired to employ a material having an extremely low coefficient of expansion which will withstand great thermal shock, a treated borosilicate glass of the type disclosed in Hood et al. Patent No. 2,106,744, granted February 1, 1938, may be used. Other suitable materials such as transparent, heat-resistant plastic are also satisfactory.

Figure 1:
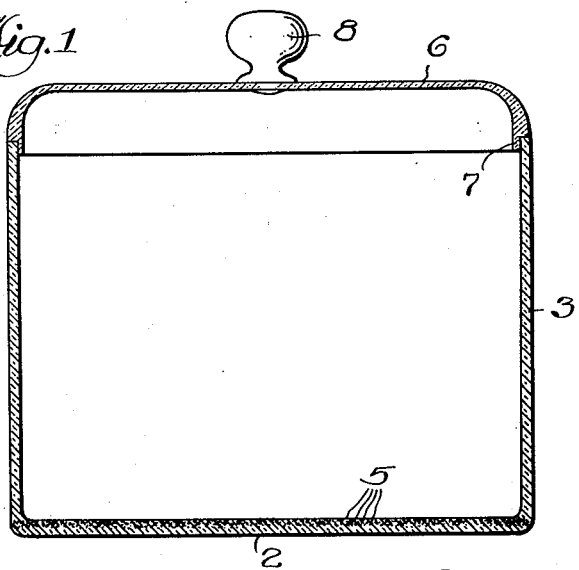
Figure 1 is a cross sectional view through a cooking vessel embodying the present invention.

The cooking vessel illustrated in Fig. 1 is designed to be positioned with its bottom 2 above a source of infra-red rays, such as gas-fired incandescent refractory material or infra-red reflector lamps. It is preferred, therefore, that bottom 2 be rough-finished on its outer surface, as indicated at 4, to decrease reflection of radiant energy rays directed thereagainst. The entire outer surface of the cooking vessel may be rough-finished, if desired.

A material 5, capable of absorbing impinging radiant energy rays and converting them to sensible heat is incorporated in bottom wall 2 as shown in Figs. 1–6. Material 5 may be carbon or other suitable coloring material. The coloring material is preferably incorporated in a portion of the bottom wall adjacent the interior surface of the vessel, as shown in Figs. 1 and 5, so that the radiant energy rays will pass through the uncolored portion and will be converted into sensible heat within the vessel walls and adjacent the interior of the vessel with attendant increased efficiency. In this position the coloring material does not come into contact with the contents of the vessel.

The coloring material may be incorporated throughout the entire thickness of a wall, as shown in Figs. 2, 3, 4 and 6. This form of construction also serves to convert radiant energy to sensible heat within the walls of the vessel and adjacent the interior of the vessel to provide greater cooking efficiency than is possible with conventional opaque metal vessels or colorless transparent vessels. Material 5 need not be positioned in bottom wall 2, but it may be positioned in side wall 3 if the source of radiant energy rays is arranged to direct rays against the side wall. In this case, the outer surface of side wall 3 is preferably rough-finished.

Coloring material 5 may be incorporated in the glass or other suitable material in manners well known in the art. Where a borosilicate glass of the type disclosed in Patent No. 2,106,744 is employed, the glass may be colored as disclosed in the patent to Nordberg et al. 2,303,756, granted December 1, 1942. As therein described, the glass may be colored by adding a suitable coloring material while the glass is in the porous state and the coloring matter is permanently sealed in the glass after firing. Penetration of the coloring material to the desired thickness may be controlled as described in Patent No. 2,303,756. The coloration imparted may serve as decorative function as well as the function of converting radiant energy rays to sensible heat.

Instead of incorporating the coloring material in the wall itself, the coloring material may be applied as a layer 5a (Fig. 7) adjacent the inner surface of bottom 2. Layer 5a may be applied to bottom 2 as a coating or lining or it may be applied as a separate member positioned within cooking vessel immediately above the bottom. Layer 5a may comprise a coating of black paint or any suitable material that will convert radiant energy rays to sensible heat. A dull black surface is preferred. The positioning of coating 5a within the cooking vessel causes the conversion of the radiant energy rays to sensible heat to take place within the cooking vessel. If the source of radiant energy rays is directed against a side wall, layer 5a will be positioned on the inner surface of the side wall.

A top cover 6, made of the same material as the cooking vessel or other suitable material, is dimensioned to fit over the upper edge of side wall 3 and is provided with a depending flange 7 fitting within the wall to help retain the heat within the cooking vessel. A handle 8 is secured to top cover 6 in any suitable manner.

Figure 2:
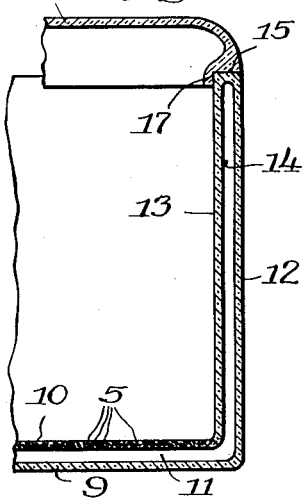
Fig. 2 is a fragmentary cross sectional view through another embodiment of the invention, showing a cooking vessel having a double-wall bottom and side wall structure.

The embodiment of the invention illustrated in Fig. 2 is essentially similar to the embodiment previously described except that the bottom comprises a pair of walls 9 and 10 spaced to provide a dead air space 11 therebetween and the side wall comprises a pair of walls 12 and 13 spaced to provide a dead air space 14 therebetween. The dead air space 14 connects with dead air space 11 so that the cooking vessel is substantially surrounded by the dead air insulation sealed in place as indicated at 15. The spaces 11 and 14 may be evacuated, if desired. The top cover 16 fits over the upper edge of side walls 12 and 13 and has a flange 17, similar to flange 7, fitting within side wall 13. The material capable of converting radiant energy into sensible heat is incorporated in inner wall 10 to obtain maximum conversion of the radiant energy to sensible heat within the vessel and closely adjacent the interior of the vessel. The outer surface of the cooking vessel is preferably rough-finished, as in the previously described embodiment, over the area against which the radiant energy rays are directed, to decrease the reflection of the radiant energy rays.

Figure 3:
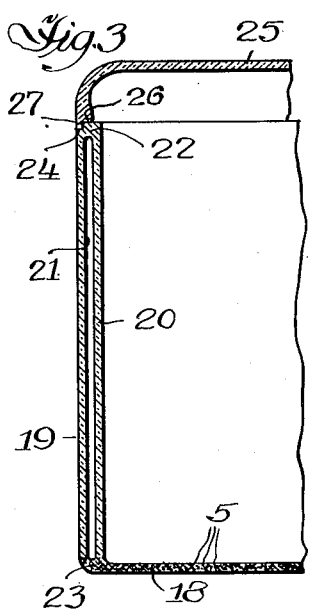
Fig. 3 is a view similar to Fig. 2, showing a cooking vessel having a bottom of single thickness and a double-wall side construction.

The cooking vessel shown in Fig. 3 has a bottom 18 of single thickness and a side wall comprising spaced walls 19 and 20 having a dead air space 21 sealed therebetween, as indicated at 22 and 23. As in the case of the embodiment illustrated in Fig. 2, the space 21 may be evacuated, if desired. The upper edge 22 of the side wall is recessed, as indicated at 24, and the top cover 25 has its lower edge 26 recessed, as indicated at 27, to fit against the recessed portion 24. The coloring material 5 and the rough finish on the outer surface of the cooking vessel in this embodiment of the invention are the same as in the other embodiments.

Figure 4:
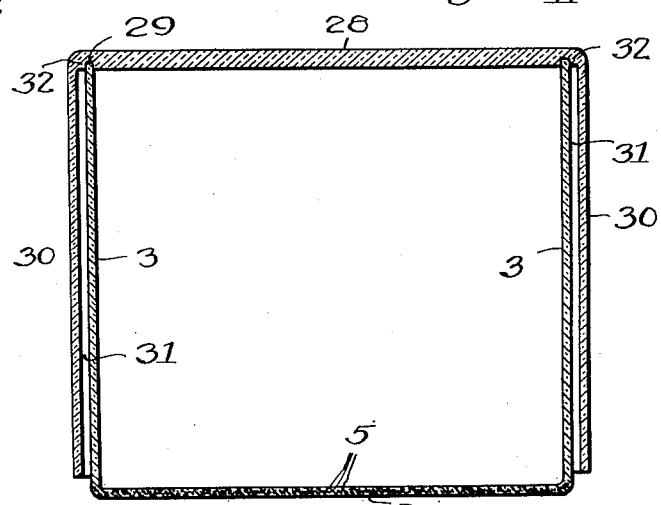
Fig. 4 is a cross sectional view of another embodiment of the invention showing a cooking vessel provided with a top cover having depending side walls to form an insulating dead air space surrounding the side walls of the vessel.

In the embodiment of the invention illustrated in Fig. 4, the cooking vessel is a substantial duplicate of the vessel shown in Fig. 1 and the same reference numerals are used to denote corresponding parts. A top cover 28, recessed as indicated at 29, fits over the top edge of side wall 3. Cover 28 projects slightly beyond side wall 3 and is provided with a depending side wall 30 which extends substantially the entire height of side wall 3 and is concentrically spaced therefrom to form a space 31 which is designed to limit or prevent movement of the air trapped therein. A portion of the heat generated by the conversion of radiant energy within the cooking vessel warms the air in space 31, and since the top end of the space is sealed, as indicated at 32, the warm air cannot be displaced by air from the surrounding atmosphere. Accordingly, space 31 is substantially a dead air space even though it is not sealed at its bottom edge. As in the case of the other embodiments of the invention, the outer surface of the vessel is rough-finished over the area against which the radiant energy rays are directed, to facilitate the most efficient transmission of radiant energy into the walls of the cooking vessel, and coloring material 5 is incorporated in the bottom wall to convert the radiant energy into sensible heat within the vessel. A handle, similar to handle 8, may be provided on this cover.

Although the cooking vessel in each of the embodiments is described as having its bottom and side wall of the same material, it will be understood that they may be formed of different materials, the essential requirement being that the portion of the vessel against which the radiant energy rays are directed be capable of permitting such rays to enter and be converted to sensible heat with maximum efficiency. It is of course preferred that the entire vessel be designed to minimize the loss of heat by conduction to the atmosphere.

While I have described preferred embodiments of my invention in considerable detail, it will be understood that the description thereof is intended to be illustrative, rather than restrictive, as many details may be modified or changed without departing from the spirit or scope of the invention. Accordingly, I do not desire to be restricted to the exact structure described.

I claim:

1. A cooking vessel having a bottom wall of a material substantially transparent to radiant energy rays and a poor conductor of sensible heat, and a material capable of absorbing radiant energy rays, said material capable of absorbing radiant energy rays being positioned adjacent the inner surface of said bottom wall so that infra-red rays entering said bottom wall impinge on said material capable of absorbing radiant energy rays and are converted thereby into sensible heat within said vessel.

2. A cooking vessel having a bottom wall of a material substantially transparent to radiant energy rays and a poor conductor of sensible heat, and a material capable of absorbing radiant energy rays, said material capable of absorbing radiant energy rays being positioned interiorly of a portion of said bottom wall adjacent the inner surface thereof so that infra-red rays entering said bottom wall impinge on said material capable of absorbing radiant energy rays and are converted thereby into sensible heat within said vessel.

3. A cooking vessel having a bottom wall of a material substantially transparent to radiant energy rays and a poor conductor of sensible heat, and a layer of material capable of absorbing radiant energy rays, said layer of material capable of absorbing radiant energy rays being positioned on the inner surface of said bottom wall so that infra-red rays passing through said bottom wall impinge on said material capable of absorbing radiant energy rays and are converted thereby into sensible heat within said vessel.

4. A cooking vessel having a bottom wall and side walls, at least one of said walls being of a material substantially transparent to radiant energy rays, and a colored material capable of absorbing radiant energy rays, said colored material being positioned adjacent the inner surface of one of said substantially transparent walls, whereby radiant energy rays transmitted through the substantially transparent wall containing said colored material are converted by said colored material to sensible heat within said cooking vessel.

5. A cooking vessel having a bottom wall and side walls, at least one of said walls being of a material substantially transparent to radiant energy rays, and a colored material capable of absorbing radiant energy rays, said colored material being positioned interiorly of a portion of one of said substantially transparent walls adjacent the inner surface thereof, whereby radiant energy rays transmitted through the substantially transparent wall containing said colored material are converted by said colored material to sensible heat within said cooking vessel.

6. A cooking vessel having a bottom wall and side walls, at least one of said walls being of a material substantially transparent to radiant energy rays, a colored lining capable of absorbing radiant energy rays, said colored lining being positioned on the inner surface of one of said substantially transparent walls, whereby radiant energy rays transmitted through the substantially transparent wall having said colored lining are converted by said colored lining to sensible heat within said cooking vessel.

7. A cooking vessel as recited in claim 4 in which the outer surface of the substantially transparent wall containing said colored material is rough-finished to minimize the reflection of radiant energy rays directed thereagainst.

8. A cooking vessel as recited in claim 4 which has outer side walls of substantially transparent material spaced from and surrounding the side walls to form a double walled structure to insulate said vessel and minimize the loss of sensible heat by conduction to the atmosphere.

9. A cooking vessel as recited in claim 4 which has an outer shell of substantially transparent material, said outer shell being spaced from the side walls and bottom wall to form a double walled structure to insulate said vessel and minimize the loss of sensible heat by conduction to the atmosphere.

References Cited in the file of this patent

UNITED STATES PATENTS

| Number | Name | Date |
|---|---|---|
| 629,122 | Davis | July 18, 1899 |
| 1,413,063 | Sailer | Apr. 18, 1922 |
| 1,466,941 | Houze | Sept. 4, 1923 |
| 1,497,764 | Simonson et al. | June 17, 1924 |
| 1,549,743 | Bultman et al. | Aug. 18, 1925 |
| 1,553,617 | Katzinger | Sept. 15, 1925 |
| 1,757,989 | Acton | May 13, 1930 |
| 1,880,358 | Payson et al. | Oct. 4, 1932 |
| 2,122,821 | Mohr | July 5, 1938 |
| 2,213,894 | Barry | Sept. 3, 1940 |
| 2,315,475 | Cobb et al. | Mar. 30, 1943 |
| 2,391,660 | Ward | Dec. 25, 1945 |
| 2,462,728 | Debs | Feb. 22, 1949 |
| 2,511,404 | Glenkey et al. | June 13, 1950 |

FOREIGN PATENTS

| Number | Country | Date |
|---|---|---|
| 336,029 | Germany | Apr. 21, 1921 |
| 724,819 | France | Jan. 30, 1932 |
| 873,890 | France | Apr. 13, 1942 |